United States Patent
Li et al.

(10) Patent No.: US 10,951,670 B2
(45) Date of Patent: Mar. 16, 2021

(54) SYSTEM, METHOD, AND APPARATUS FOR FLOOR CONTROL DURING PUSH TO TALK

(71) Applicant: Telefonaktiebolaget LM Ericsson (publ), Stockholm (SE)

(72) Inventors: Yunxi Li, Järfälla (SE); Mats Folke, Vällingby (SE); Johnny Karout, Gothenburg (SE); Qianxi Lu, Beijing (CN); Xinghua Song, Beijing (CN); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/565,296

(22) PCT Filed: Apr. 7, 2016

(86) PCT No.: PCT/IB2016/051989
§ 371 (c)(1),
(2) Date: Oct. 9, 2017

(87) PCT Pub. No.: WO2016/162832
PCT Pub. Date: Jan. 31, 2006

(65) Prior Publication Data
US 2018/0077208 A1    Mar. 15, 2018

(30) Foreign Application Priority Data
Apr. 9, 2015    (WO) ................ PCT/CN2015/076170

(51) Int. Cl.
*H04L 29/06* (2006.01)
*H04W 4/10* (2009.01)
*H04W 76/45* (2018.01)

(52) U.S. Cl.
CPC ...... *H04L 65/4046* (2013.01); *H04L 65/4061* (2013.01); *H04W 4/10* (2013.01); *H04W 76/45* (2018.02)

(58) Field of Classification Search
CPC .......... H04W 4/06; H04W 4/08; H04W 4/10; H04W 4/38; H04W 4/70; H04W 76/14;
(Continued)

(56) References Cited

U.S. PATENT DOCUMENTS 5,850,611 A    12/1998  Krebs
7,680,077 B1    3/2010  Clark et al.
(Continued)

FOREIGN PATENT DOCUMENTS

| CN | 1794835 A | 6/2006 |
|---|---|---|
| CN | 101711011 A | 11/2009 |
| CN | 101785329 A | 7/2010 |

OTHER PUBLICATIONS

"3rd Generation Partnership Project; Technical Specification Group Services and System Aspects; Mission Critical Push to Talk (MCPTT) over LTE; Stage 1 Release 13", 3GPP TS 22.179 v 13.1.0 (Year: 2015).*

(Continued)

*Primary Examiner* — Raymond S Dean
(74) *Attorney, Agent, or Firm* — Baker Botts, LLP

(57) ABSTRACT

There is disclosed herein systems, methods, and apparatuses for floor control in a push to talk communication session. According to certain embodiments, a method for floor control comprises, prior to transmitting a first message to one or more wireless devices, determining, at a first wireless device, a priority of the first message. The method also comprises determining, at the first wireless device, whether a floor is available for transmitting the first message based on the determined priority of the first message. The method
(Continued)

additionally includes, upon the floor being available, transmitting the first message from the first wireless device to the one or more wireless devices. The method additionally includes transmitting the first message from the first wireless device without the first wireless device first requesting the floor from a remote floor controller.

18 Claims, 7 Drawing Sheets

(58) Field of Classification Search
CPC ..... H04W 76/40; H04W 76/45; H04W 76/50; H04L 51/18; H04L 65/4046; H04L 65/4061; H04L 67/104; H04L 67/322; H04L 67/325; H04L 67/1019; H04L 69/28
See application file for complete search history.

(56) References Cited

U.S. PATENT DOCUMENTS

| | | |
|---|---|---|
| 2007/0161393 A1 | 7/2007 | Wu et al. |
| 2007/0202910 A1 | 8/2007 | Brewer et al. |
| 2007/0280256 A1* | 12/2007 | Forslow .................. H04W 4/10 370/395.2 |
| 2007/0281723 A1* | 12/2007 | Chotai .................. H04W 76/45 455/518 |
| 2008/0146203 A1 | 6/2008 | Khawand et al. |
| 2008/0194279 A1* | 8/2008 | Choksi ................ H04L 65/4038 455/518 |
| 2009/0054010 A1 | 2/2009 | Shaffer et al. |
| 2009/0137263 A1 | 5/2009 | Abbate et al. |
| 2015/0319585 A1* | 11/2015 | Raj ........................ H04W 12/08 455/518 |
| 2016/0295496 A1* | 10/2016 | Atarius ................ H04W 76/14 |
| 2017/0257876 A1* | 9/2017 | Loehr ................... H04W 72/10 |

OTHER PUBLICATIONS

3GPP TS 36.321 v12.5.0; Technical Specification; 3rd Generation Partnership Project; Technical Specification Group Radio Access Network; Evolved Universal Terrestrial Radio Access (E-UTRA); Medium Access Control (MAC) protocol specification (Release 12)—Mar. 2015.

3GPP TR 23.779 v0.6.0; Technical Report; 3rd Generation Partnership Project; Technical Specification Group Services and System Aspects; Study on application architecture to support Mission Critical Push to Talk over LTE (Mcptt) services (Release 13)—Mar. 2015 i.

PCT Notification of Transmittal of the International Search Report and the Written Opinion of the International Searching Authority, or the Declaration for International application No. PCT/IB2016/051989—dated May 30, 2016.

SA WG2 Meeting #106; San Francisco, California, USA; Source: Telefonica UK; Title: MCPTT "Floor" control for ProSe Direct Communication (revision of S2-14xxxx) (S2-144292)—Nov. 17-21, 2014.

* cited by examiner

SYSTEM, METHOD, AND APPARATUS FOR FLOOR CONTROL DURING PUSH TO TALK

PRIORITY

This nonprovisional application is a U.S. National Stage Filing under 35 U.S.C. § 371 of International Patent Application Serial No. PCT/IB2016/051989 filed Apr. 7, 2016, and entitled "System, Method, and Apparatus for Floor Control During Push to Talk" which claims priority to International Patent Application Serial No. PCT/CN2015/076170 filed Apr. 9, 2015, all of which are hereby incorporated by reference in their entirety.

TECHNICAL FIELD

Embodiments presented herein relate to communication using push to talk, and in particular to systems, methods, network nodes, wireless devices, computer programs, or computer program products for floor control in a push to talk communication session.

BACKGROUND

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Device-to-device communication is a well-known and widely used component of many existing wireless technologies, including ad hoc and cellular networks. Examples include Bluetooth and several variants of the IEEE 802.11 standards suite, such as WiFi Direct. These systems operate in unlicensed spectrum.

Recently, device-to-device (D2D) communications as an underlay to cellular networks has been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and (dynamic) sharing between the device-to-device services and cellular services is more flexible and provides higher spectrum efficiency.

The transmission mode when sending messages during D2D communication may be either:
  Unicast—a specific wireless device is the receiver;
  Multicast—a group of wireless devices are receivers (may also be denoted groupcast); or
  Broadcast—all wireless devices are receivers.

Where there is no cellular network D2D communication, messages can be sent from one device to another device without prior arrangement, thereby reducing the overhead and increasing the communication capacity, which is crucial in push to talk sessions in emergency situations. The source device transmits a message to one (unicast) or more (multicast/groupcast/broadcast) other devices, without first ensuring that the recipients are available and ready to receive the message. Such communication may be used for one-to-one or one-to-many communication, but it is particularly effective for multicast and broadcast transmissions and thus well-suited for broadcast and group communication. The communication may be realized, for example, via physical layer (PHY) unicast/multicast/groupcast/broadcast transmissions. With PHY broadcast transmissions, the transmissions may still be turned into unicast/groupcast/multicast at higher layers. For example, in the MAC layer, multicast or even unicast addresses may be used. Alternatively, if using broadcast on both PHY and MAC, multicast or unicast IP addresses may be used at the IP layer.

One of the ways to efficiently support D2D communication is to use a message that includes a scheduling assignment (SA) followed by the data transmission. SAs are control messages used for direct scheduling of D2D communication. SAs are transmitted by the wireless device that intends to transmit D2D data (e.g., voice data, GPS data, etc.) and they are received by the wireless devices that are potentially interested in such messages. The SAs are transmitted on dedicated resources characterized by time and frequency, and are typically a sparse resource. SAs provide useful information that can be used by the receiver (e.g., to correctly decode the D2D data transmission associated with the SA, such as the resources for data transmission, the modulation/coding parameters, timing information, identities for the transmitter and/or receiver, etc). Typically SAs are transmitted prior to the actual data transmission so that a receiver is able to selectively receive data based on the content of the SAs. The data transmissions scheduled by an SA may be referred to as a "transmission pattern."

For the message transmission procedure for two wireless devices that are both outside network coverage at the time of message transmission, both wireless devices need to be preconfigured with certain parameters, such as resource pool information (time and frequency configuration) to be used later for message transmission. For example, when wireless device-A needs to transmit a message to wireless device-B, wireless device-A typically sends a sync signal that wireless device-B can use as a time reference. Then an SA may be sent followed by the actual data.

According to TS 22.278 requirements Proximity-based Services (ProSe) communication should provide a mechanism by which some users and/or groups are given higher priority when transmitting messages. Such priority may be either static or dynamic. Priority defines who gets to transmit first when there is a shortage of resources, such as when only one transmitter at a time is allowed (e.g., in a push to talk communication session). Further, priority is used to decide if pre-emption is required in order to ensure that the correct transmitter is allowed to transmit. The various types of priority are explained in more detail in this text excerpt from TS 22.179:

The User Static Attributes include information categorizing the user, possibly by several criteria (e.g. first responder, second responder, supervisor, dispatcher, and administrator) as well as jurisdictional boundaries and possibly, a pre-configured system-wide individual priority level.
  The Group Static Attributes include information about the nature/type of the group and the owning organization(s), the jurisdictional boundaries for transmitters and receivers within the group, the normal hours of operation for the group, pre-emption dispositions relative to other groups, and the default minimum priority of the group, i.e. the minimum priority characteristics that are provided to all the Participants in a group call associated with this group, regardless of their individual priority characteristics.

The User Dynamic Attributes include the user/participant's operational status (e.g. on/off duty), his location, the type of incident (e.g. MCPTT Emergency or Imminent Peril) he might be involved in and whether or not he initiated it, whether or not he is individually involved in a formally managed incident and if yes, the boundaries of the incident area, the incident severity and his assigned role in the resolution of the incident.

The Group Dynamic Attributes include the type of incident (e.g. MCPTT Emergency or Imminent Peril), if any, the group is currently handling and, in case of involvement in a formally managed incident, the boundaries of the incident area and the incident severity.

A group ID is to be used to identify the group to which the wireless device belongs and to ensure that communication is received (and decoded) by the correct wireless device. Further, the group ID is used to set up encryption. Since all wireless devices will be configured with an ID, priority should be mapped to said IDs.

Mission-critical communication is about communication in National Security and Public Safety (NSPS) operations. NSPS uses push-to-talk, but often has the possibility of putting extra requirements on the network, e.g., lower latency (including setup times) and more fine-grained prioritization functions.

A Push-to-talk (PTT) service provides an arbitrated method by which two or more users may engage in communication. Users may request permission to transmit (e.g., by pressing a button). The Mission Critical Push-to-Talk (MCPTT) over LTE service supports an enhanced PTT service, suitable for mission critical scenarios, based upon 3GPP Evolved Packet System (EPS) services.

The MCPTT Service is intended to support communication between several users, where each user has the ability to gain permission to talk in an arbitrated manner. The MCPTT Service builds on the existing 3GPP transport communication mechanisms provided by the EPS architectures to establish, maintain, and terminate the actual communication path(s) among the users.

The MCPTT Service allows users to request permission to talk (transmit voice/audio/video) and provides a deterministic mechanism to arbitrate between requests that are in contention. This may be referred to as floor control, which is an arbitration system that determines who has the authority to transmit at a particular point in time. A group call may be a communication session in which multiple users are grouped together to receive messages from one another. The communication session may often be a push to talk communication session. When multiple transmit requests occur, the determination of which user's request is accepted and which users' requests are rejected or queued is based upon a number of characteristics (e.g., the respective priorities of the users in contention). The MCPTT Service allows a user with higher priority (e.g., emergency condition) to override (interrupt/pre-empt) the current talker, if the current talker has a lower priority. Pre-emption is the act of terminating on-going calls in order to free up resources for a higher priority call request. MCPTT Service also supports a mechanism to limit the time a user talks (holds the floor) thus permitting users of the same or lower priority a chance to gain the floor.

The MCPTT service can operate in two modes: On-Network mode and Off-Network mode, respectively. With Off-Network mode MCPTT users employ a direct path for ProSe Discovery and ProSe Communication. With On-Network mode, MCPTT uses legacy cellular communication paths without the use of ProSe Discovery and the ProSe Communication.

It is desired to have floor control to support MCPTT in off-network mode, which will be based on ProSe technology. Some possible solutions on floor control have been discussed with respect to 3GPP TR 23.779 Study on application architecture to support Mission Critical Push To Talk over LTE (MCPTT) services, (Release 13), v060 (herein after "Ref[1]"). Below is a possible procedure:

Step 0) All wireless devices involved in a group call will maintain a list of wireless devices in its proximity, i.e. by reading its list, a wireless device can know which wireless device(s) are reachable to it. The list will be updated periodically with some mechanism based on the data received from other wireless devices.

Step 1) The transmitting wireless device (e.g. wireless device-1) sends an "Originate" message carrying information of its identity ("wireless device-1") and priority.

Step 2) The receiving wireless device(s) (e.g., wireless device-2) receive the "Originate" message and will reply with an "Ack" message or some lower layer feedback indication, which carries the information of its identify (e.g., "wireless device-2") and the identity of the wireless devices ending "Originate" message ("wireless device-1").

Step 3) the transmitting wireless device can continue when, and only when, it receives "Ack" messages from some specific wireless devices in its list.

One of the problems with this solution is that before the wireless device can start transmitting messages, it must first transmit and receive some control messages (e.g., the "Originate" and "Ack" messages) with other wireless devices. These control messages will be transmitted via ProSe paths. When the wireless device's elected resource is used, these controlling messages may be lost, for example, due to interference/collision among different transmitters. This may result in floor control failure. Similarly, when in on-network mode, when the eNB scheduled resource is used, some delay may be introduced, as both the transmitting and receiving wireless devices need to request resources from their serving eNB.

Another problem is that all receiving wireless devices will transmit an "Ack" message when they receive the "Originate" message. This may lead to multiple receiving wireless devices transmitting "Ack" messages simultaneously despite the receiving wireless device potentially being able to only receive one "Ack" message at a time. Moreover, if more than one receiving wireless device transmits an "Ack" message using the same time-frequency resources, the two messages may cause interference causing the transmitting wireless device to not receive any of the conflicting "Ack" messages. This may result in the receiving wireless device assuming the transmitting wireless device has the floor while the requesting wireless device would assumes the floor request failed because it did not receive the "Ack" messages. As a result, no one has the floor, which leads to a bad user experience. Some randomization may mitigate the potential problem but cannot resolve the risk of this happening entirely and will lead to additional delay.

Another problem is that because the wireless devices need to transmit either "Originate" or "Ack" messages during each floor control procedure, the signalling overhead may be significant. This may be especially true when there is a large number of wireless devices involved in the same group call. As the number of wireless devices increases, the transmission success rate may decrease (e.g., the floor control message may not be transmitted). As a result, the wireless device has to retransmit floor control messages, which generates more traffic to the system and makes interference worse.

Yet another problem relates to mobility. For example, when a first wireless device has the floor and moves out of the ProSe range, a second wireless device may then take the floor. However, should the first wireless device return within ProSe range, both wireless devices may be transmitting and the floor control fails.

In addition to the problems above, the solution discussed in 3GPP TR 23.779 Study on application architecture to support Mission Critical Push To Talk over LTE (MCPTT) services, (Release 13), v060 does not address how a higher priority transmitter gets the floor from an ongoing lower priority transmission.

Another solution discussed in 3GPP TR 23.779 Study on application architecture to support Mission Critical Push To Talk over LTE (MCPTT) services, (Release 13), v060 includes the following steps:

Step 0) A centralized node, called a Floor Arbitrator (FA), needs to be selected. This is typically done before a call starts, but can also be done during a call in case the FA is unreachable and a new FA needs to be selected.

Step 1) When a wireless device wants to transmit a message, it has to request the floor from the selected FA with floor control messages.

This solution shares many of the same problems as the solution in the distributed system. Furthermore, it relies on a centralized FA, which creates a single point of failure problem. When the FA fails, or moves out of proximity range temporarily, floor control does not work. In this case, a FA reselection procedure can be triggered to select a new FA, but may lead to additional delay and resource consumption. Moreover, an FA selection/reselection procedure adds complexity.

SUMMARY

An object of certain embodiments disclosed herein is to provide a wireless device that is able to communicate in a group call using push to talk in which each wireless device will act as its own floor arbitrator to determine whether or not it can gain the floor. The wireless device may base its decision on the priority of itself, its message, and other wireless devices in the group call (e.g., the current floor holder, any wireless devices waiting for the floor, etc.). The wireless device may, in some instances, calculate the priority of itself, its message, and other wireless devices based on a priority calculation function and corresponding information. Each wireless device may use the same calculation function and information. This may advantageously reduce the amount of signalling needed before a wireless device is able to transmit. It may also advantageously reduce the reliance on a single FA. It may also reduce the amount of time between when a user indicates that he or she wants to transmit a message, and when the wireless device is able to actually transmit that message.

According to certain embodiments, a method for floor control comprises, prior to transmitting a first message to one or more wireless devices, determining, at a first wireless device, a priority of the first message. The method also comprises determining, at the first wireless device, whether a floor is available for transmitting the first message based on the determined priority of the first message. The method additionally includes, upon the floor being available, transmitting the first message from the wireless device to the one or more wireless devices.

In some embodiments of the method, the first message is transmitted from the first wireless device without the first wireless device first requesting the floor from a remote floor controller.

In particular embodiments, the method also comprises receiving, at the first wireless device, a second message from a second wireless device. The second message is received while the first wireless device is holding the floor. The second wireless device is one of the one or more wireless devices. The method also includes determining, at the first wireless device, a priority of the second wireless device based on the second message. Upon the priority of the second wireless device being greater than the priority of the first message, the method includes releasing the floor.

In certain embodiment the method further comprises determining, at the first wireless device, that the floor is held by a second wireless device of the one or more wireless devices. The method also includes determining, at the first wireless device, that the priority of the first message is greater than a priority of a current floor holder. The method additionally includes overriding the current floor holder and transmitting the first message from the first wireless device to the one or more wireless devices.

In some embodiments, the method also includes receiving, at the first wireless device, a second message from a second wireless device. The second wireless device may be one of the one or more wireless devices. The method further includes determining, at the first wireless device, a priority of the second wireless device based on the second message. The method additionally includes updating, at the first wireless device, a database with the determined priority of the second wireless device. The database comprises a determined priority for each of the one or more wireless devices for which a message has been received at the first wireless device.

In particular embodiments the first message comprises an identification of the first wireless device.

In certain embodiments of the method, determining, at the first wireless device, the priority of the first message comprises determining, at the first wireless device, the priority of the first message based on one or more dynamic priority attributes and one or more static priority attributes.

In some embodiments of the method, determining if the floor is available comprises determining, at the first wireless device, when a last transmission was received from a second wireless device of the one or more wireless devices. In these embodiments, determining if the floor is available may further comprise, upon the last transmission being received by the first wireless device before a first threshold, determining that the second wireless device currently holds the floor. Additionally, determining if the floor is available may also comprise, upon the last transmission being received by the first wireless device after a first threshold, determining that the second wireless device has released the floor.

According to particular embodiments, a wireless device for floor control comprises a processor. The processor is configured to, prior to transmitting a first message to one or more wireless devices, determine a priority of the first message. The processor is further configured to determine whether a floor is available for transmitting the first message based on the determined priority of the first message. The wireless device also comprises a wireless interface coupled to the processor. The wireless interface is configured to, upon the floor being determined available, transmit the first message to the one or more wireless devices.

According to some embodiments, a wireless device for floor control comprises a processor and computer readable storage media. The storage media contains instructions that are executable by the processor, whereby the wireless device is operative to, prior to transmitting a first message to one or more wireless devices, determine a priority of the first message. The wireless device is further operative to determine whether a floor is available for transmitting the first message based on the determined priority of the first message. The wireless device is additionally operative to, upon the floor being determined available, transmit the first message to the one or more wireless devices.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will be thorough and complete, and will fully convey the scope of the inventive concept to those skilled in the art. Like numbers refer to like elements throughout the description.

It is to be noted that any feature of any of the embodiments disclosed herein may be applied to any other embodiment, wherever appropriate. Likewise, any advantage of any of the embodiments may apply to any of the other embodiments, and vice versa. Other objectives, features and advantages of the enclosed embodiments will be apparent from the following detailed disclosure, and drawings.

Figure 1:
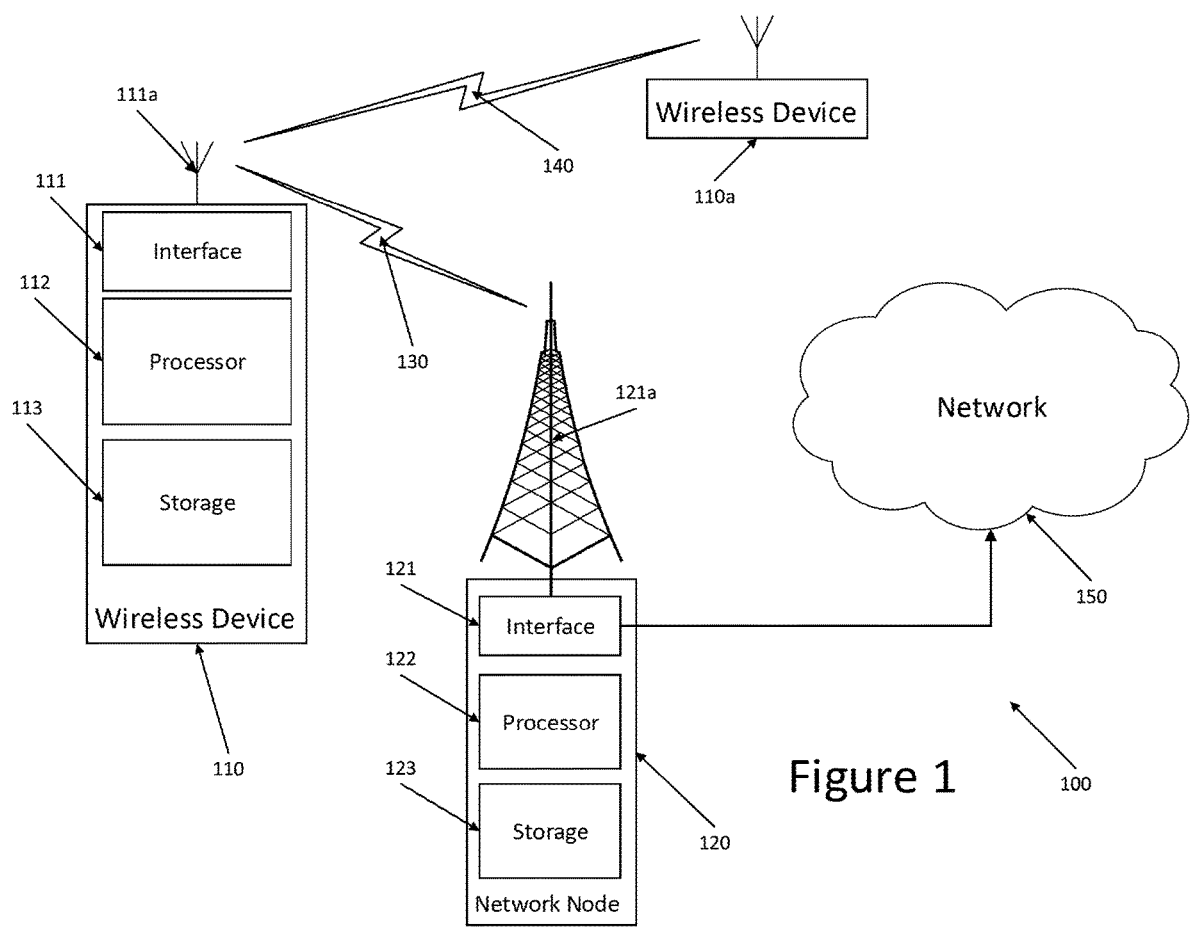
FIG. 1 is a wireless network comprising a more detailed view of a network node and a wireless device, according to particular embodiments.

FIG. 1 illustrates a wireless network comprising a more detailed view of network node 120 and wireless device (WD) 110, in accordance with a particular embodiment. For simplicity, the embodiment of network 100 depicted in FIG. 1 only comprises network 150, network node 120 and WDs 110 and 110a (collectively referred to as WDs 110). Network node 120 comprises processor 122, storage 123, interface 121, and antenna 121a. Similarly, WD 110 comprises processor 112, storage 113, interface 111 and antenna 111a. The components of WD 110a, which may be similar to the components of WD 110, are not illustrated for purposes of simplicity. The components of the various devices of network 100 may work together in order to provide network node and/or WD functionality, such as providing wireless connections in a wireless network and allowing WDs 110 to manage floor control locally (e.g., each WD 110 is able to determine for itself whether or not it has, or can take, the floor). In different embodiments, network 100 may comprise any number of wired or wireless networks, network nodes, base stations, controllers, wireless devices, relay stations, and/or any other components that may facilitate or participate in the communication of messages and/or signals whether via wired or wireless connections.

Network 150 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 120 comprises interface 121, processor 122, storage 123, and antenna 121a. These components are depicted as single boxes located within a single larger box. In practice however, a network node may comprises multiple different physical components that make up a single illustrated component (e.g., interface 121 may comprise terminals for coupling wires for a wired connection and a radio transceiver for a wireless connection). As another example, network node 120 may be a virtual network node in which multiple different physically separate components interact to provide the functionality of network node 120 (e.g., processor 122 may comprise three separate processors located in three separate enclosures, where each processor is responsible for a different function for a particular instance of network node 120). Similarly, network node 120 may be composed of multiple physically separate components (e.g., a NodeB component and a RNC component, a BTS component and a BSC component, etc.), which may each have their own respective processor, storage, and interface components. In certain scenarios in which network node 120 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 120 may be configured to support multiple RATs. In such embodiments, some components may be duplicated (e.g., separate storage 123 for the different RATs) and some components may be reused (e.g., the same antenna 121a may be shared by the RATs).

Processor 122 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 120 components, such as storage 123, network node 120 functionality. For example, processor 122 may execute instructions stored in storage 123. Such functionality may include providing various wireless features discussed herein to a WD, such as WD 110, including any of the steps or methods disclosed herein. In certain embodiments, processor 122 may be used to determine one or more wireless resources that WDs 110 may use for push to talk and/or device to device communication (sometimes referred to herein as a group call).

Storage 123 may comprise any form of non-transitory volatile or non-volatile computer readable memory including, without limitation, persistent memory, solid state memory, remotely mounted memory, magnetic media, optical media, random access memory (RAM), read-only memory (ROM), removable media, or any other suitable local or remote memory component. Storage 123 may store any suitable instructions, data or information, including software and encoded logic, utilized by network node 120. In some embodiments, storage 123 may store one or more determined priorities for WDs 110. The priority information may be stored and/or maintained in a list, database, or other organization of data useful for determining the relative priorities of the participants in a push-to-talk communication session.

Network node 120 also comprises interface 121 which may be used in the wired or wireless communication of signalling and/or data between network node 120, network 150, and/or WD 110. For example, interface 121 may perform any formatting, coding, or translating that may be needed to allow network node 120 to send and receive data from network 150 over a wired connection. Interface 121 may also include a radio transmitter and/or receiver that may be coupled to or a part of antenna 121a. The radio may receive digital data that is to be sent out to other network nodes or WDs via a wireless connection. The radio may convert the digital data into a radio signal having the appropriate channel and bandwidth parameters. The radio signal may then be transmitted via antenna 121a to the appropriate recipient (e.g., WD 110). In some embodiments, interface 121 may receive messages transmitted by WDs 110 that may be used in determining a relative priority of WDs 110. In some scenarios, network node 120 may act as a repeater for push-to-talk communications between WDs 110. In such a scenario, interface 121 may receive and re-broadcast communications between WDs 110.

Antenna 121a may be any type of antenna capable of transmitting and receiving data and/or signals wirelessly. In some embodiments, antenna 121a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 110 may be any type of wireless endpoint, mobile station, mobile phone, wireless local loop phone, smartphone, user equipment, desktop computer, PDA, cell phone, tablet, laptop, VoIP phone or handset, or smart equipment which is able to wirelessly send and receive data and/or signals to and from a network node, such as network node 120, and/or other WDs, such as WD 110a. WD 110 comprises interface 111, processor 112, storage 113, and antenna 111a. Like network node 120, the components of WD 110 are depicted as single boxes located within a single larger box, however in practice a WD may comprises multiple different physical components that make up a single illustrated component (e.g., storage 113 may comprise multiple discrete microchips, each microchip representing a portion of the total storage capacity). Also, in some embodiments, some of the features and/or functions of WD 110 may be performed or located remotely. For example, in some embodiments, storage 113 may include both local storage and remote storage (e.g., cloud based storage).

Processor 112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 110 components, such as storage 113, WD functionality. Such functionality may include providing various wireless features discussed herein, including any of the steps or methods disclosed herein. For example, in some embodiments, prior to transmitting a message via interface 111, processor 112 may determine the priority of the message to be sent. Processor 112 may also compare the priority of the message with the priority of, for example, the current floor holder to determine whether or not the current floor holder can be interrupted to transmit the message. In some scenarios, the priority of a WD holding the floor may be different when the WD is transmitting than when the WD is not transmitting. That is, a message may have its own priority that may differ from the priority of the WD that sent the message (e.g., an emergency message). Unless otherwise stated, a reference to the priority of a WD or the priority of the current floor holder shall include a priority based on the ID of the WD itself and/or the message sent by the WD or current floor holder.

Storage 113 may be any form of volatile or non-volatile memory including, without limitation, persistent memory, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by WD 110. In some embodiments storage 113 may maintain a list, database, or other organization of data that keeps track of the priority of the WDs from which messages have been received at WD 110 from a push to talk communication session. This stored information may be used by processor 112 in determining who has the floor, whether or not WD 110 has the floor, can gain the floor, should release the floor, etc.

Interface 111 may be used in the wireless communication of signalling and/or data between WD 110 and network node 120, and/or between WD 110 and WD 110a. For example, interface 111 may perform any formatting, coding, or translating that may be needed to allow WD 110 to send and receive data from network node 120 and/or WD 110a over a wireless connection. Interface 111 may also include a radio transmitter and/or receiver that may be coupled to or a part of antenna 111a. The radio may receive digital data that is to be sent out to network node 120 via a wireless connection. The radio may convert the digital data into a radio signal having the appropriate channel and bandwidth parameters. The radio signal may then be transmitted via antenna 111a to network node 120.

Antenna 111a may be any type of antenna capable of transmitting and receiving data and/or signals wirelessly. In some embodiments, antenna 111a may comprise one or more omni-directional, sector or panel antennas operable to transmit/receive radio signals between 2 GHz and 66 GHz. For simplicity, antenna 111a may be considered a part of interface 111 to the extent that a wireless signal is being used.

The components above may work together to send and receive communications in a push to talk communication session in which each WD 110 determines for itself whether or not it has the floor (and can thus transmit a message). This may be accomplished, in certain embodiments, through the monitoring, by WDs 110, of the transmissions in a group call. Depending on the capabilities of interface 111 and the other components of WD 110, WD 110 may monitor transmissions by other WDs when interface 111 is not transmitting or while it is transmitting. Then, when WD 110 intends to transmit, processor 112 may compare the priority of itself (and/or the message to be sent) with the priorities of other WDs (e.g., the current floor holder, any WDs waiting for the floor, etc.) to determine whether WD 110 can transmit the message now or must wait to transmit. In some instances, when WD 110 is transmitting, or has the floor but is not transmitting, it may determine that a received message is of a higher priority and may stop transmitting and/or release the floor. This provides a distributed solution, which avoids the problem of having a single point of failure that may occur in a system that uses a single remote floor controller. Moreover, certain embodiments may utilize existing transmissions without introducing additional signalling which may be a better use of wireless resources (e.g., there is no additional floor control signalling among WDs prior to transmission). This may reduce service delay and resource consumption. In addition, the solution provides for the ability to have an override capability.

The following example may help illustrate how certain components may aid in providing floor control in a push to talk communication session. This example may focus on an off-network scenario (e.g., where the WDs 110 communicate without the aid of network node 120). However, such a scenario is not required and certain features of particular embodiments may be equally applicable to an on-network scenario and/or where WDs 110 are on-network but establish a push to talk session that is off-network (e.g., using a first frequency for on-network communication and a second frequency for off-network communication).

As is generally known, before a device can transmit a message in a push to talk paradigm, it first has to have control of the floor. Floor control is the permission to transmit. If a device has the floor, it has permission to transmit; if it does not have the floor then it does not have permission to transmit. Accordingly, in certain embodiments, prior to WD 110 transmitting a message it must first determine whether it has the floor, and if not, whether it can gain the floor. In certain embodiments this is done, prior to the message being sent, by processor 112 determining a priority of a message to be sent by interface 111. The priority of the message may take into account a priority of WD 110 and/or its user (e.g., fireman versus fire chief), the communication session (e.g., was the session created for a fire or a robbery), and/or the message itself (e.g., a general communication versus a direct command). For example, a fire chief trying to issue a command during a fire may have the highest priority while a police officer wanting to ask what roadblock he should meet at may have a lower priority.

Once processor 112 has determined the priority of the message that is to be sent, it can determine whether the floor is available for interface 111 to transmit the message. In some embodiments this may be done by consulting information maintained in storage 113 relating to the priority of the current floor holder (if anyone) and/or of other WDs in the group call. If the priority of the message to be transmitted is greater than the priority of the current floor holder, or if there is no current floor holder, then interface 111 may transmit the message. In some embodiments, the message may include an identification of WD 110, such as a MAC address, an IP address, a ProSe UE ID, a SIP address, or an identifier of the user of WD 110. It should be noted that this message was transmitted without interface 111 first sending a floor request message and waiting for a response granting or denying WD 110 the floor. If the priority of the message is equal to or less than the priority of the current floor holder, WD 110 may wait until the floor is released before transmitting the message.

In some instances, while WD 110 is holding the floor (the floor may be held in a variety of ways such as while a WD is transmitting, after a WD transmits and before another UE takes the floor, etc.) interface 111 may receive a message from another WD. Once interface 111 receives the message, processor 112 may determine a priority of the sending WD from the received message. A table, list, database, or other organization of data (generally referred to herein as a database) related to priority may then be updated with the determined priority. The database may be maintained in storage 113. The determination of priority and updating of the database may be done anytime a message is received by interface 111 (not just when a message is received while holding the floor). If processor 112 determines that the priority of the received message is greater than a priority of WD 110 or a message being transmitted by WD 110, then processor 112 may release the floor and, if applicable, prepare the message to be presented to a user of WD 110 (e.g., play the message through a speaker of WD 110 and/or display the message on a screen of WD 110).

In other instances, another WD may currently hold the floor. Processor 112 may determine that there is a current floor holder and that the message to be transmitted by interface 111 has greater priority than the current floor holder. Once this has been determined, the current floor holder may be overridden and interface 111 may transmit the message. In some embodiments, because the other UEs are also receiving messages and determining their priority, there is no need for WD 110 to transmit an explicit override command. Rather, if processor 112 determines that the priority of WD 110's message is greater than the priority of the current floor holder, interface 111 may simply begin to transmit. The other WDs would receive the higher priority message and then regard WD 110 as the current floor holder. Similarly the current floor holder would receive the message from WD 110 and, upon realizing that it was of a higher priority, release the floor. In some embodiments, the higher priority message may be sent using resources that are not being used by the current floor holder.

In some scenarios, processor 112 may determine that the priority of a message to be transmitted by 111 does not have a high enough priority to interrupt a current floor holder. In such a scenario, interface 111 may have to wait to transmit the message until processor 112 determines that the floor is available. In certain embodiments, this may entail processor 112 determining when interface 111 last received a transmission from another WD. If the last transmission was received less than a first threshold amount of time ago (e.g., 2 SC periods), processor 112 may determine that the floor is not available and is still held by the WD that made the last transmission (or in some scenarios that another WD waiting for the floor has a higher priority). On the other hand, if the last transmission was received more than a threshold amount of time ago, processor 112 may determine that the floor has been released and is available for WD 110 and that interface 111 may transmit the message.

When processor 112 is determining the priority of a message to be sent and/or messages that have been received, processor 112 may consider a variety of different combinations of dynamic and static priority attributes. The attributes to be considered and how they are to be considered (e.g., weighting) may be based on a priority calculation function. This function may be known and used by all the WDs within a particular group call. Thus, each WD within the group call will calculate the same priority given the same inputs. In some embodiments the priority attributes may include User Static Attributes, Group Static Attributes, User Dynamic Attributes, and Group Dynamic Attributes. In some embodiments, static priority attributes may include (1) the role of the transmitter (e.g. first responder, second responder, supervisor, dispatcher, administrator, etc.); and (2) system-wide individual priority level (e.g., pre-configured priority of the WDs). In some embodiments, dynamic priority attributes may include (1) whether the WD is waiting for the floor; (2) how long the WD has been waiting (e.g., when the WD started waiting); and (3) how long since the last transmission was received from the respective WD.

In some embodiments, storage 113 may be preconfigured with the static priority attributes. These static priority attributes may be updated (e.g., periodically, on-demand, in response to an event, etc.) from the network when WD 110 is within range of, for example, network node 120. Similarly, the priority calculation function may be preconfigured or network provided. In some embodiments, the priority calculation function may be located in network 150 and interface 111 may send a request to network 150 to calculate the priority (and interface 111 would also receive the results and processor 112 would update storage 113 accordingly). In certain embodiments the dynamic priority attributes may updated in real time when certain events occur, such as:
 1) when WD 110 intends to transmit;
 2) when a new WD gains the floor;
 3) when WD 110 is overridden and not allowed to transmit; or
 4) when WD 110 receives an empty data transmission.

Based on the priority attributes information, processor 112 may calculate the priority of WD 110 and/or the message to be transmitted as well as any other WDs for which interface 111 has received messages. In particular embodiments, storage 113 may maintain a list of priority attributes wherein each element of the list corresponds to a particular WD. For example, the priority result information may comprise information similar to what is in Table 1 below:

TABLE 1

| | Priority Result | |
|---|---|---|
| WD Identifier | Priority Result | Calculation Time |
| Current WD | 2 | 2015-03-25 11:15:00:000 |
| WD 2 | 3 | 2015-03-25 11:16:00:000 |
| WD 3 | 2 | 2015-03-25 11:15:03:000 |

The column "Calculation Time" indicates the time when the corresponding priority was calculated, when the priority result may or may not change. In some embodiments, processor 112 may wait for a period of time (e.g., 2 seconds) before recalculating priority. This may conserve resources when the same WD has transmitted several messages within the period of time because the priority is not likely to have changed. Similarly, processor 112 may wait to recalculate until receiving a particular number of messages from the same WD.

In some embodiments, the "Priority Result" column information may be updated upon triggering events (or a combination of triggering events), including, but not limited to:
 1) periodically (e.g., based on "Calculation Time");
 2) when there is a change in "Priority Attributes" (e.g., one or more of a change in attributes at the local WD, a change in attributes of a remote WD, a change made in attributes by the network, etc);
 3) when interface 111 receives a message and corresponding Sidelink Control Information (SCI) from another WD for which priority information has not yet been stored (the priority result information of the transmitting WD may be calculated and stored and/or the priority results for the other WDs may be recalculated).

Some of the features of some of the embodiments disclosed herein may take advantage of the analysis of received transmissions to allow for distributed floor control among the WDs that are participating in a push to talk communication session. This may further allow ProSe based communication to be handled smoothly. In particular, where communication is connection-less and WDs are moving. Embodiments disclosed herein may also allow for the smooth handling of WDs which join in the middle of an ongoing push to talk communication session. Another benefit of some of the embodiments disclosed herein is that if a WD temporarily moves out of range of the other WDs, the other WDs can detect that and transmit if possible. This may improve the possibility of transmission from group call perspective.

As discussed above, floor control for a group call may be used to decide which WD can transmit within the group call. Messages that are transmitted within a particular group call may only be considered for purposes of that particular group call (even if the transmitter and one of the receivers are both part a different group call). In other words, a message targeting other groups will not impact the floor control of the current group. In some embodiments, an L2 Destination ID may be used to specify the group to which a message belongs.

In some instances interface 111 may transmit an empty data transmission. An empty data transmission may refer to a packet that is transmitted with a MAC PDU header and the corresponding SCI without including any media data (e.g., voice). The empty data transmission may allow a receiving WD to decode the complete source ID and destination ID. Moreover, in some embodiments the empty data transmission may be used to support a queue for floor control as discussed in more detail below.

When involved in a group call, interface 111 may continue to receive transmissions made by other WDs in the group call, when possible (e.g., when it is not transmitting). In some embodiments, even with an ongoing transmission, interface 111 may be able to receive transmissions. For example, if interface 111 uses discontinuous timeslots to transmit, it may continue to receive transmissions during the non-transmitting timeslots. In some embodiments, a group call may reserve multiple sets of resources. One such set of resources may be used by the current floor holder while a second set of resources may be used specifically for overriding a current floor holder, signalling that a particular WD is waiting for the floor, etc.

In certain embodiments, interface 111 may receive transmissions from other WDs, these transmissions may include, among other things, a MAC PDU and a corresponding SCI. Once the MAC PDU and corresponding SCI have been received successfully, processor 112 may be able to decode the complete source ID and destination ID of the transmission. In some instances, processor 112 may determine that interface 111 may stop receiving messages from this WD (e.g., if the transmission is determined to be lower priority than WD 110, or a message being transmitted by interface 111) during the rest of the SCI period of the transmitting WD. This may save receiving power.

Although components for both WD 110 and network node 120 are depicted and described, in certain embodiments, WD 110 may be operating in an area in which it is out of range of any network node and is utilizing device to device communication to communicate directly with other WDs (e.g., ProSe communication).

Figure 2:
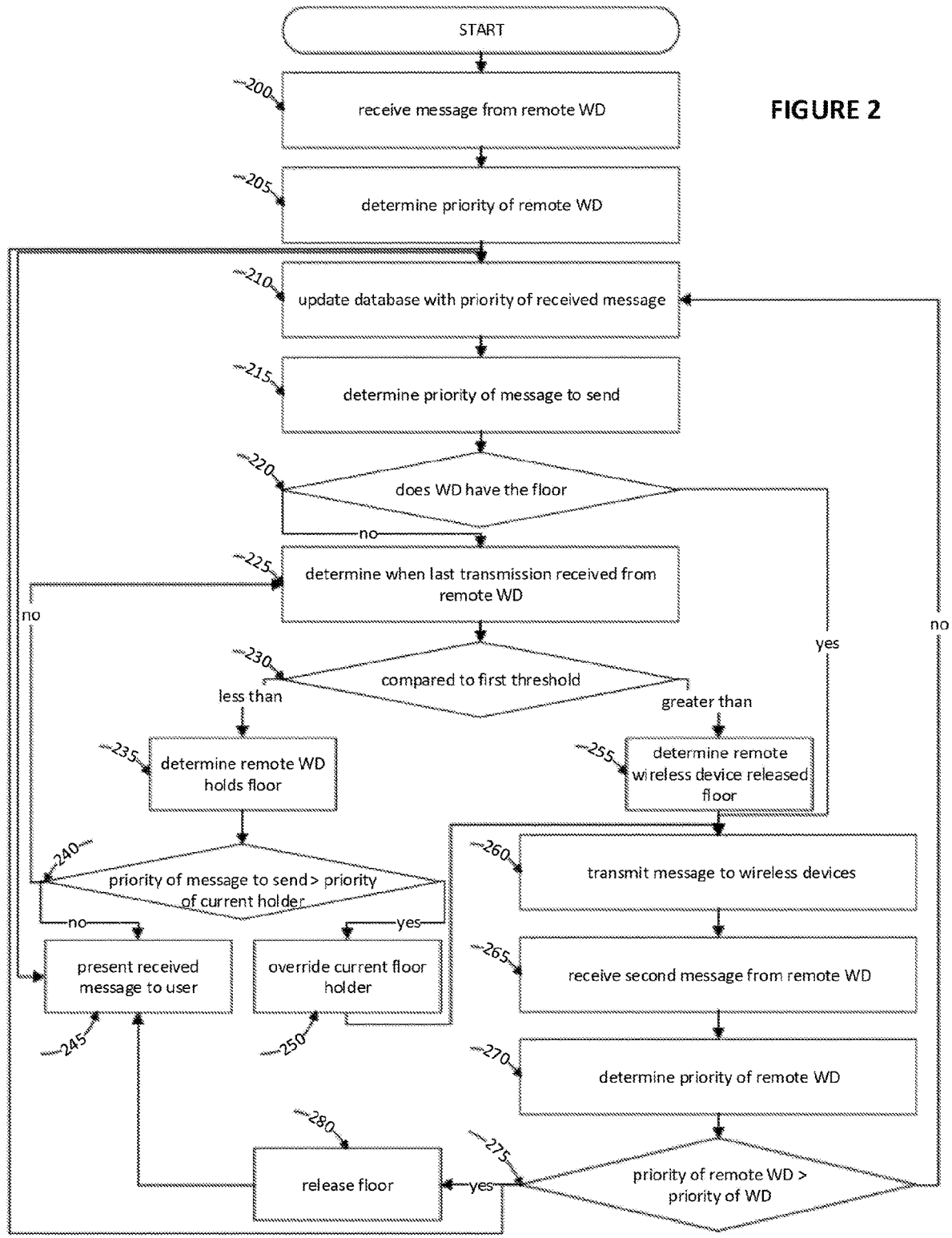
FIG. 2 is a flowchart of a method of floor control, according to particular embodiments.

FIG. 2 is a flowchart of a method of floor control, according to particular embodiments. The method depicted in FIG. 2 comprises a series of steps involved in a particular method performed by a WD participating in a group call. The depicted steps, and their illustrated order, relate to a particular scenario. Other scenarios and other embodiments may have different steps performed in different orders. In this scenario, the WD performing the method is in a group call when the method begins. The group call may be a MCPTT, a non-critical PTT, or any other group call in which floor control is used to determine who may transmit. To avoid confusion, the WD performing the depicted method shall be referred to as the local WD. The group call may be taking place out of range of any network node (sometimes referred to as off-network). The depicted method begins at step 200 with the receipt of a message. The message may be received by the local WD from another WD within the group call. The message may include an identification of the WD that sent the message.

At step 205 the local WD determines the priority of the remote WD from the message received within the group call. The priority may be determined using any of a variety of different functions for calculating priority. In some embodiments, the priority for each WD in the group call may be pre-loaded on the local WD such that determining the priority of the remote WD from the incoming message comprises looking up the identification of the remote WD. In particular embodiments, the priority may be calculated from a combination of different static and dynamic priority attributes, as discussed above. After the priority is determined, in this scenario, the method proceeds, substantially simultaneously, to steps 245 and 210.

In the scenario illustrated in FIG. 2, the WD was not transmitting a message when it received the message from the remote WD. At step 245, the message is presented to the user of the WD. Presenting the message will typically involve playing the audio content from the message through a speaker of the local WD. However, other options, such as visual based options on a screen of the local WD, may be used to present the message to the user.

At step 210, the local WD updates a database with the determined priority. The database comprises a list, table, or other organization of data that at least associates each determined priority with a respective identification of the corresponding WD. The database may include dynamic and static priority attributes, including relative ranking of the WDs in the group call, and a time stamp of when the last calculation was made for the respective WD. This allows the local WD to easily track who is the current floor holder, and if/when the local WD can take the floor itself.

At step 215, the local WD determines the priority of a message to be sent. The priority of the message to be sent may be calculated in the same fashion as the priority of the message that was received at step 200. As can be seen in the flowchart, the priority of the message to be sent is determined prior to the local WD transmitting the message. This may allow for local floor control at each WD without the need for a remote floor controller and the corresponding signalling (e.g., request, and ACK/NACK response).

At step 220, the determined priority of the message to be sent is then used, in connection with the database of priority attributes of other WDs, to determine if the floor is available and whether the local WD has the floor. For example, in another scenario, the local WD may be the first WD to try and transmit or it may have already recently transmitted, as such the local WD would have the floor. However, in this scenario, the local WD determines that the floor is not immediately available. If the floor is not available to the local WD, then the method may proceed to step 225.

At step 225, if it was determined that the floor is not available, the WD determines when the last transmission was received from the current floor holder. This last transmission time may then be compared to a first threshold value at step 230. The first threshold value may be a predetermined length of time after a WD transmits a message for which the WD is able to maintain control of the floor. In some of the embodiments discussed herein with respect to other figures, the first threshold was set at 2 SC periods. If the last transmission was received less than the threshold amount of time, then the method proceeds to step 235 where the local WD determines that the remote WD currently holds the floor. If the last transmission was received more than the threshold amount of time, then the method proceeds to step 255 where the local WD determines that the remote WD has released the floor.

At step 240, the local WD determines whether the priority of the message to be sent (step 215) is greater than the priority of the current floor holder. If the priority of the message to be sent is less than the priority of the current floor holder, then the method returns to step 225, perhaps after waiting a period of time. This loop may continue until the threshold amount of time has passed since the last transmission. In some embodiments, the local WD may send an empty data message to alert the other WDs that it is waiting for the floor. If the remote WD is still transmitting while, or after, the local WD compares priority, the local WD at step 245, may continue to present the message being received from the remote WD.

If it is determined that the priority of the message to be sent is greater than the priority of the message being sent by the current floor holder, then at step 250, the local WD overrides the current floor holder and, at step 260, transmits the message to the other WDs in the group call. Of note, the local WD is able to transmit the message without first having to request (and receive permission for) the floor from a remote floor controller. In some embodiments, the local WD may first look for free resources not being used by the current floor holder. This may help to avoid interference which may result in some WDs in the group call not receiving the transmission from the local WD.

At step 265, the WD receives a second message from a remote WD. This may be the same WD that sent the message received at step 200, or it may be a different WD. The second message may be received while the local WD is transmitting or while the local WD has the floor but is not transmitting. Then, at step 270 the local WD determines the priority of the remote WD based on the second message. This determined priority is then compared to the priority of the message being sent by the local WD, or if not transmitting, the priority of the local WD. If the priority of the remote WD is not greater than the local priority, then the database of priority attributes is updated at step 210 and the WD that sent the second message is now deemed to be waiting for the floor. If the priority of the remote WD is greater than the priority of the local WD, then the method proceeds, substantially simultaneously, to step 210 to update the priority attributes database, and to step 280 where the local WD releases the floor. Then, the method proceeds to step 245 where the second message is presented to the user.

The steps described above are merely illustrative of certain embodiments. It is not required that all embodiments incorporate all the steps above nor that the steps be performed in the exact order depicted in FIG. 2. For example, if the priority of the message to be sent is greater than the priority of the current floor holder, the method may skip the steps related to checking how long ago the last transmission was made by the current floor holder. Furthermore, some embodiments may include steps not illustrated in FIG. 2. For example, in some embodiments, when the local WD determines that the floor is not available and that it has to wait for the floor to be available (step 240), it may send an empty data message to alert the other WDs in the group call that it is waiting for the floor before the method returns to step 225.

The steps illustrated in FIG. 2, and described above, as well as any other features, functions or steps disclosed herein, may be performed through a computer program product that may, for example, be executed by the components and equipment illustrated in FIG. 1. For example, storage 113 may comprise computer readable means on which a computer program can be stored. The computer program may include instructions that when executed by processor 112 (and any operatively coupled entities and devices, such as interface 111 and storage 113) enable the methods according to embodiments described herein. The computer program and/or computer program product may thus provide means for performing any steps herein disclosed.

Figure 3:
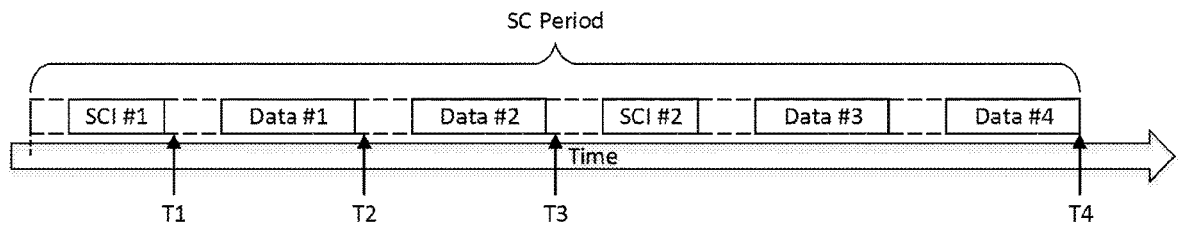
FIG. 3 is a timing diagram illustrating a scenario in which a wireless device may stop receiving messages to conserve power, according to particular embodiments.

FIG. 3 illustrates an example in which WD 110, for example, is receiving messages transmitted from WD 110a, for example. At time T1 WD 110 receives SCI #1 successfully. At time T2 WD 110 receives data #1 but, in this scenario, the received message is flawed (e.g., fails a Cyclic Redundancy Check). At T3 WD 110 receives data #2 successfully. At this point, WD 110 has received one SA (the SA associated with data #2) and one SCI from WD 110a. If the priority of the incoming message is lower than the priority of the current floor holder, WD 110 may to stop receiving messages from WD 110a for the rest of the current SC period (e.g., from time T3 to time T4).

Information that interface 111 receives (before it stops receiving at time T3) may be stored in storage 113. Processor 112 may then use the stored information to update the priority attributes (if needed) corresponding to the source identifiers of the transmission (e.g. "SRC" field in MAC PDU in 3GPP TS 36.321 EUTRAN; Medium Access Control (MAC) protocol specification, V12.5.0).

In certain embodiments, it may be desirable to prevent an overridden WD from continuing to transmit to avoid having more than one WD occupying the floor. A WD, for example WD 110, may consider the floor as being occupied by another WD, for example WD 110a, if the following occur within a particular time period (e.g., during the last certain period, e.g. 3 seconds, or one SC period of WD 110a):

(1) WD 110 received at least one non-empty transmission from WD 110a; AND
(2) WD 110a was not overridden by another WD.

Figure 4:
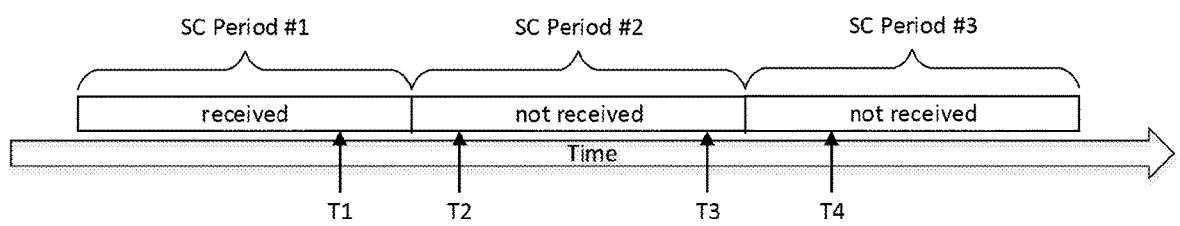
FIG. 4 is a timing diagram illustrating a scenario in which a wireless device has released the floor, according to particular embodiments.

In FIG. 4, a receiving WD, for example WD 110, receives non-empty data message during SC period #1 from another WD, for example WD 110a, but receives nothing during SC periods #2 and #3. At time T1 WD 110 considers the floor occupied by WD 110a. At time T2 and T3, WD 110 still considers the floor occupied by WD 110a because it has not yet been a complete SC period since the last transmission from WD 110a. At time T4, WD 110 considers the floor released by WD 110a.

In some embodiments a WD may hold onto the floor even after it has finished transmitting. For example a WD, for example WD 110, may consider itself as occupying the floor, if the following occur within a particular time period (e.g., during the last certain period, e.g. 3 seconds, or one SC period of WD 110):

(3) WD 110 transmitted at least one non-empty data message; AND
(4) WD 110 was not overridden by another WD.

Figure 5:
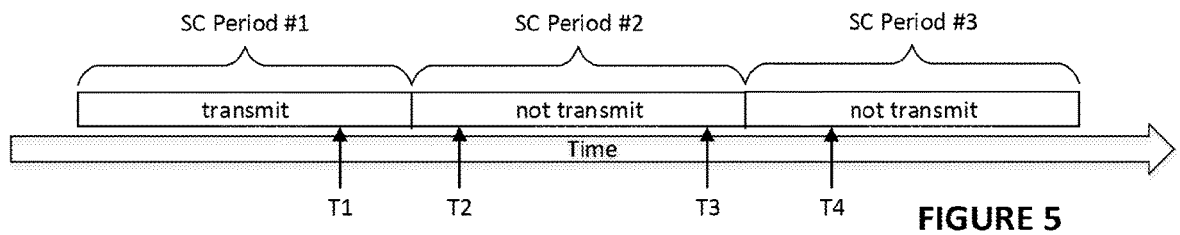
FIG. 5 is a timing diagram illustrating a scenario in which a wireless device retains floor control despite not transmitting any messages, according to a particular embodiment.

For example, in FIG. 5, WD 110 transmits a non-empty data message during SC period #1 but does not transmit during SC periods #2 and #3. At time T1, WD 110 considers itself as the floor holder. At times T2 and T3, WD 110 considers itself as the floor holder, even though it is not transmitting any messages. At time T4, WD 110 considers itself as having released the floor.

In some embodiments, an override may occur if WD 110a, for example, currently holds the floor when interface 111 starts transmitting a message that has a higher priority than WD 110a. Depending on the embodiment and/or the capabilities of the WDs, it may be that WD 110a can continue transmitting even though it was overridden and the floor was passed to WD 110 (e.g., receiving WDs may store the transmission from WD 110a and wait until WD 110 releases the floor and then present the message transmitted from WD 110a) or WD 110a stops transmitting and the floor is passed to WD 110.

In certain scenarios, such as in an emergency situation, interface 111 may transmit an emergency message (e.g. in an emergency situation or a situation of imminent peril) regardless of floor control. In some embodiments, processor 113 may first try and identify resources which are not being used by the current floor holder. These free resources may then be used to send the emergency message.

In some instances, a WD, such as WD 110, may occupy the floor and then not transmit any messages for some time. In such an instance, another of the WDs in the group call, such as WD 110*a*, may occupy the floor. If WD 110 wants to transmit again after WD 110*a* has taken the floor, and WD 110's priority is not higher than WD 110*a*, WD 110 will have to wait until WD 110*a* releases floor. This may increase service delay for WD 110. In some cases, WD 110 may intend to keep the floor after having made a first transmission to shorten the delay due to waiting for floor control. In some embodiments, interface 111 may transmit empty data messages periodically when it occupies the floor with nothing to transmit, but wants to keep the floor. In some embodiments, the ability to send empty data messages periodically may be limited to certain WDs (e.g., high ranking users within a group call).

If WD 110 does not currently occupy the floor, it will first need to get the floor before it can transmit. When WD 110 determines that a WD is releasing the floor, WD 110 may try to get the floor. If the calculated priority of WD 110 is the highest among all WDs waiting for the floor, processor 112 may determine that WD 110 has the floor and allow interface 111 to start transmitting. If, on the other hand, WD 110 does not have the highest priority among those WDs waiting for the floor, WD 110 may have to continue to wait. In some embodiments, WD 110 may maintain a queue of WDs that are waiting for the floor.

If the floor is occupied by another WD, processor 112 may compare the priority between the current floor holder and itself (or of the message to be sent). If WD 110 has a higher priority, it takes the floor and starts transmitting. If, on the other hand, WD 110 has a lower priority, interface 111 may transmit an empty data message. Processor 112 may, if possible, select resources that are not being used by the current transmission. The transmitted empty data message may serve as an indication that WD 110 is waiting for the floor and may put WD 110 in a queue for the floor among the other WDs in the group call. In some embodiments, the empty data message may be transmitted periodically while WD 110 is waiting for the floor. This may help to ensure that all the WDs in the group call have updated information, including any WDs that may have joined the group call late.

In some instances, when an override occurs, it is possible that during a short period, the overriding WD and the overridden WD transmit simultaneously. As such, the overriding WD and the overridden WD may miss messages from each other due to the half-duplex nature of PTT. Other receiving WDs also may not be able to receive the messages from both the overriding WD and the overridden WD during the override period (e.g., due to the WD's capabilities). In some embodiments, the overridden WD, which stops ongoing transmission due to being overridden, may assume that the message(s) transmitted during the last certain time (e.g., the last SC period) before the override may have been missed by the receiving WDs. This potentially missed message(s) may be re-transmitted once the overridden WD regains the floor. An example of this is shown in FIG. 6.

Figure 6:
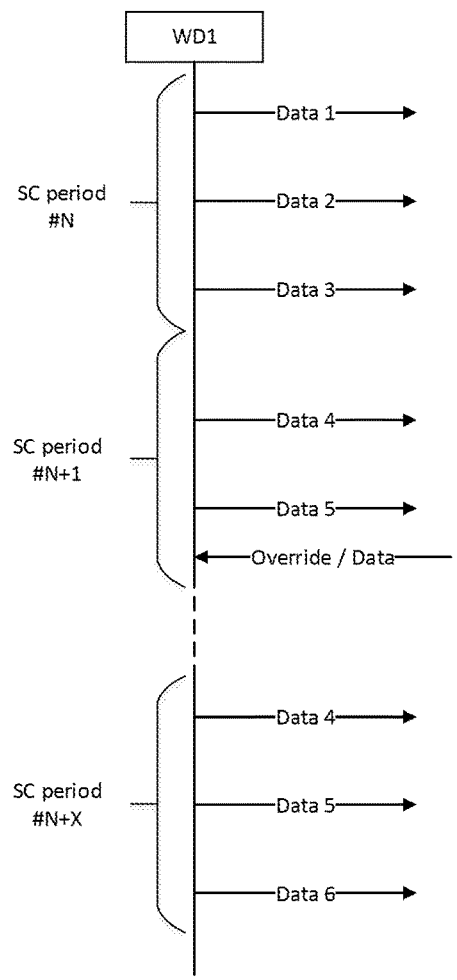
FIG. 6 is a timing diagram illustrating a scenario in which a wireless device receives retransmissions of certain messages after being overridden, according to a particular embodiment.

In FIG. 6, WD1 is transmitting but during SC period #N+1, it was overridden. WD1 may determine that the message transmitted during the overriding period (#N+1), data 4 and data 5, was not received by the other WDs in the group call. When WD1 regains the floor at SC period #N+X, it can retransmit data 4 and data 5 if it is still desirable to transmit the messages.

Figure 7:
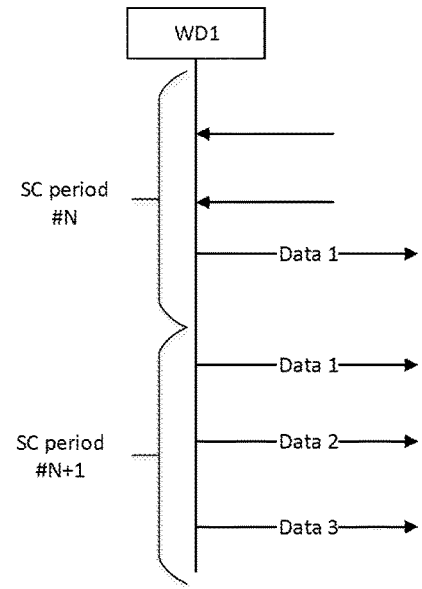
FIG. 7 is a timing diagram illustrating a scenario in which a wireless device retransmits some messages after overriding the current floor holder, according to a particular embodiment.

For the overriding WD, it assumes the message being transmitted during the beginning certain time after the override may not be received by other WDs and/or the overridden WD. The overriding WD can retransmit the message it transmitted during the beginning certain time (i.e. during the first SC period). For example, in FIG. 7, when WD1 transmits data 1 overriding the current floor holder, during SC period #N, WD1 may determine that data 1, transmitted during the overriding period, may be missed by the other WDs. In the succeeding SC period, SC period #N+1, data 1 may be retransmitted. In some embodiments, when a WD wants to override a current floor holder, the overriding WD may initially send a non data message or a message with nonce data (e.g., dummy data) during the overriding period knowing that it has a good likelihood of not being received and then transmit the actual data in the succeeding SC periods.

In certain embodiments, to avoid the WD with the highest priority always controlling the floor, which makes it impossible for lower priority WDs to transmit, some embodiments may place a time limit on how long a WD may hold the floor. For example, in some embodiments, the WD having the floor may maintain two timers, Timer_Floor and Timer_Wait. The length of these two timers can be group specific and configured in each WD. Timer_Floor indicates the maximum time for a WD to have the floor. Whenever a new WD gets the floor, the timer restarts. In some embodiments, the timer also restarts whenever the WD transmits a message with non-empty data. When the current floor holder loses or releases the floor, the timer stops (until a new WD takes the floor and then the timer restarts). When Timer_Floor expires, the WD holding the floor releases it. Timer_Wait indicates how long a WD must wait before it can retry gaining the floor after releasing the floor (e.g., due to Timer_Floor expiration). When a WD releases the floor due to Timer_Floor expiring, Timer_Wait restarts. When Timer_Wait expires, the WD can try to get the floor. When Timer_Wait is running, and there is another WD occupying the floor or waiting for the floor, the WD cannot try to get the floor. When the timer is running but there is no other WD occupying the floor or waiting for the floor, the WD can try to get the floor.

Figure 8:
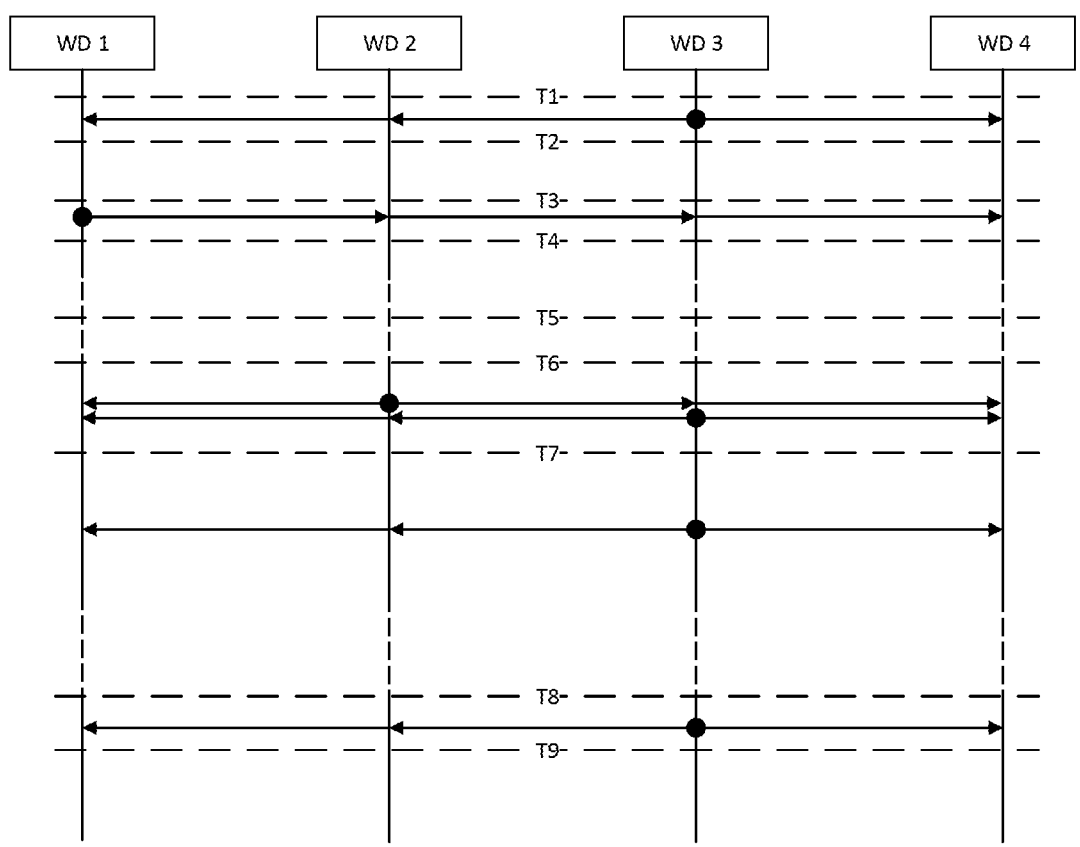
FIG. 8 is a signalling diagram in which wireless devices do not use empty data messages to indicate they are waiting for the floor, according to particular embodiments.

FIG. 8 depicts a signalling diagram showing floor control in accordance with particular embodiments. In the depicted embodiment, WDs 1-4 are all involved in a group call (e.g., a push to talk call). In general, the priority of the WDs is such that WD 1>WD 2>WD 3>WD 4. Furthermore, for purposes of this signalling diagram it is assumed that the SC periods of all the WDs are the same and that they are aligned. For the sake of simplicity, in this example, if a WD is overridden it will stop transmitting. Retransmission is not considered in this example.

First, at time T1, WD 3 determines that it has a message to transmit. It checks to see if the floor is available and determines that no WD is occupying the floor. WD 3 then starts transmitting. As the transmission reaches each of the other WDs in the group call, the other WDs know WD 3 is occupying the floor. At time T2, they may update their internal priority information to reflect that WD 3 is occupying the floor. In some embodiments, they may also start a timer to keep track of how long WD 3 holds the floor.

At time T3, WD 1 determines that it has a message to transmit to the rest of the WDs in the group call. However, WD 3 is still occupying the floor. Despite the fact that WD 3 holds the floor, because WD 1 has a higher priority, WD 1 is able to override WD 3 and starts transmitting. At time T4, the other WDs have received the transmission from WD 1 and now know that WD 1 is occupying the floor. They may also determine that because WD 3 was overridden (as opposed to releasing the floor) WD 3 is waiting for the floor. The WDs may update their internal priority information to reflect WD 1 holds the floor and they may restart the timer keeping track of how long WD 1 holds the floor.

At time T5, WD 2 determines that it has a message to transmit to the rest of the WDs in the group call. However, WD 1 is still occupying the floor. Unlike the previous instance, WD 2 is a lower priority than the current floor holder WD 1. Because of the lower priority, WD 2 is not able to transmit its message because it cannot override WD 1. In this embodiment, empty data messages are not used to signal to the other WDs in the group call that a WD wants the floor. Thus, at time T5, the priority information in WD 2 is different than the priority information in the other WDs. In particular, WD 2's priority information indicates that WD 1 is occupying the floor and that WDs 2 and 3 are waiting for the floor; however the other WDs consider WD1 as the current floor holder and only WD3 as waiting for the floor.

At time T6, WD 1 has not transmitted for a period of time equivalent to two SC periods (this may be tracked as an amount of time or as the number of SC periods). In this example, this is the maximum length of time that a WD can hold the floor. Accordingly, the WDs in the group call all consider the floor released by WD 1. At this point, WD 2 determines that WD 1 has released the floor and that it has a higher priority than WD 3 and thus the highest priority among all WDs waiting for the floor. Accordingly, WD 2 takes the floor and starts transmitting. At approximately the same time, WD 3 also determines that WD 1 has released the floor and that it is the only WD waiting for the floor. Accordingly, WD 3 takes the floor and starts transmitting. As a result, WD 2 and WD 3 start transmitting at approximately the same time. As their respective transmissions reach the other WDs in the group call, the WDs will determine that WD 2 has a higher priority than WD 3 and will present the message from WD 2. WD 3 will recognize that WD 2 is higher priority and that it is overridden by WD 2 and will stop transmitting. Similarly, WD 2 will recognize that it has a higher priority than WD 3 and will continue to transmit.

At time T7, all the WDs in the group call know that WD 2 holds the floor and that WD 3 is waiting for the floor. At time T8, WD 2 has not transmitted for two SC periods. Accordingly, the WDs of the group call determine that WD 2 has released the floor. WD 3 determines that the floor has been released by WD 2 and is now available. Accordingly, WD 3 takes the floor and starts transmitting. At time T9, all the WDs know that WD 3 occupies the floor.

Figure 9:
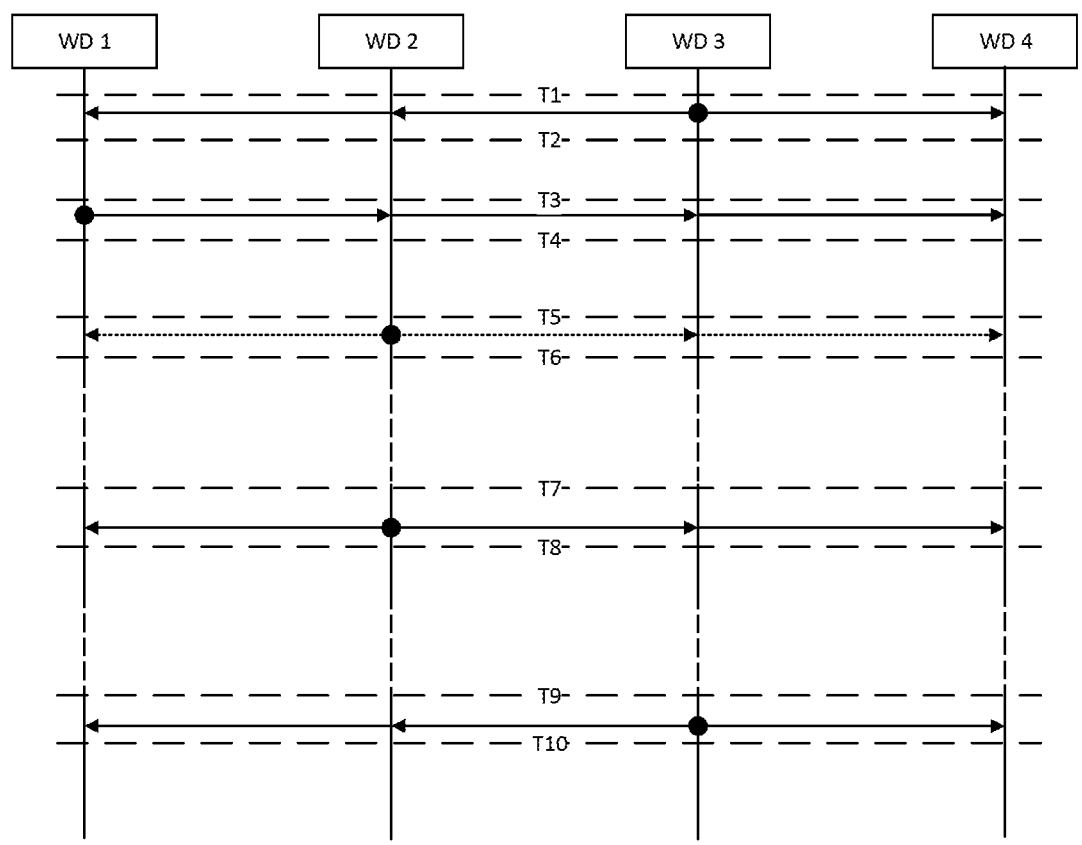
FIG. 9 is a signalling diagram in which wireless devises use empty data messages to indicate they are waiting for the floor, according to particular embodiments.

FIG. 9 depicts a signalling diagram showing floor control in accordance with particular embodiments. In the depicted embodiment, WDs 1-4 are all involved in a group call (e.g., a push to talk call). In general, the priority of the WDs is such that WD 1>WD 2>WD 3>WD 4. Furthermore, for purposes of this signalling diagram it is assumed that the SC periods of all the WDs are the same and that they are aligned. For the sake of simplicity, in this example, if a WD is overridden it will stop transmitting. Retransmission is not considered in this example.

At time T1 WD 3 determines that it has a message to transmit. WD 3 determines that there is no other WD currently occupying the floor. Accordingly, WD 3 may begin to transmit. At time T2 the other WDs in the group call know WD 3 is occupying the floor. All the WDs in the group call should have updated their respective priority information to reflect the fact that WD 3 is the current floor holder.

At time T3, WD 1 determines that it has a message to transmit. Having updated the priority information maintained at WD 1, WD 1 determines that WD 3 is currently occupying the floor but that WD 1 has a higher priority. Based on the higher priority, WD 1 is able to override WD 3 and starts transmitting. At time T4, the WDs of the group call know that WD 1 has gained the floor and that WD 3 is waiting for the floor. The WDs update their respective priority information.

At time T5, WD 2 determines that it has a message to transmit. From its priority information, WD 2 determines that WD 1 is currently occupying the floor and has a higher priority. Thus, WD 2 cannot override WD 1 and start transmitting right away, rather it needs to wait for WD 1 to release the floor. However, unlike in FIG. 8, in FIG. 9 WD 2 identifies resources not being used by WD 1 and transmits an empty data message. At time T6, the other WDs in the group call know that WD 2 would like the floor when it is available. Accordingly, the WDs update their respective priority information to show that WD 1 currently occupies the floor and that WDs 2 and 3 are waiting for the floor. Unlike the scenario discussed with respect to FIG. 8, in this scenario, all the WDs recognize the same two WDs waiting for the floor.

At time T7 WD 1 has not transmitted for two SC periods. The WDs of the group call will accordingly determine that WD 1 has released the floor and will update their respective priority information. WD 2, having updated its priority information will determine that it has the highest priority among those WDs waiting for the floor and that it thus has the floor and can begin transmitting its message. At approximately the same time, WD 3 also determines that the floor has been released by WD 1 but recognizes that WD 2, who is also waiting for the floor, has a higher priority than WD 3. WD 3 thus determines that it must continue waiting for the floor. At time T8 the WDs of the group call know that WD 2 is currently occupying the floor and that WD 3 is waiting for the floor. They update their respective priority information accordingly.

At time T9, WD 2 has not transmitted for two SC periods. The WDs in the group call will determine that WD 2 has released the floor and will update their respective priority information. WD 3, having updated is priority information, will know that it is the only WD waiting for the floor and will accordingly take the floor and begin to transmit its message. At time T10, the WDs in the group call will update their respective priority information to reflect that WD 3 is currently occupying the floor.

Figure 10:
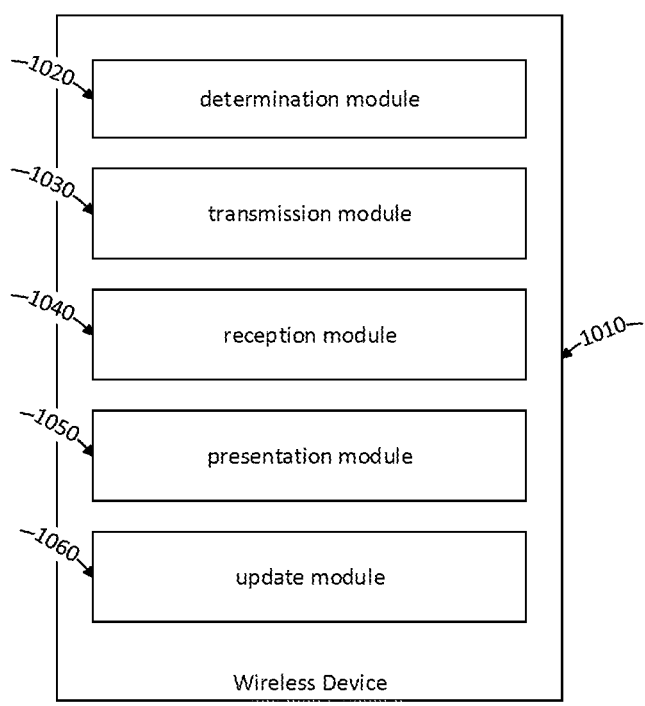
FIG. 10 is a block diagram of a wireless device, according to particular embodiments.

FIG. 10 is a schematic block diagram illustrating the functional modules used in floor control, according to particular embodiments. In particular, there is depicted the functional modules of a particular WD 1010. In general terms, each functional module depicted therein may be implemented in hardware and/or in software. The functional modules may comprise software, computer programs, subroutines, libraries, source code, or any other form of executable instructions that are run by, for example, a processor. Preferably, one or more or all functional modules may be implemented by processor 112, possibly in cooperation with storage 113 and/or interface 111. Processor 112 and storage 113 may thus be arranged to allow processor 112 to fetch instructions from storage 113 and execute the fetched instructions to allow the respective functional module to perform any steps or functions disclosed herein. The illustrated modules may further be configured to perform other functions or steps not explicitly described with respect to the respective module, including providing any features or functions disclosed with respect to any of the other figures provided herein. In addition, in some instances a single depicted module may comprise multiple modules. For example, determination module 1010 may comprise a determination module configured to determine priority of incoming messages and a determination module configured to determine whether the floor is available.

In this FIG. 10, WD 1010 comprises determination module 1020, transmission module 1030, reception module 1040, presentation module 1050, and update module 1060. Below is a closer look at some of the features and functions of the depicted modules. For purposes of explanation, it may be assumed that WD 1010 is involved in a group call, using push to talk, that comprises one or more other WDs.

In certain embodiments, determination module 1020 may be configured to, prior to transmitting a first message to one or more WDs, determine a priority of the first message. In some embodiments determination module 1020 may be configured to determine whether a floor is available for transmitting the first message based on the determined priority of the first message. In certain embodiments, determination module 1020 may be configured to determine a priority of a second WD. In particular embodiments, determination module 1020 may, upon the priority of the second WD being greater than the priority of the first message, be configured to determine that it should release the floor. In some embodiments, determination module 1020 may be configured to determine that the floor is held by a second WD of the one or more WDs. In certain embodiments, determination module 1020 may be configured to determine that the priority of the first message is greater than a priority of the current floor holder. In some embodiments, determination module 1020 may be configured to determine when a last transmission was received from a second WD of the one or more WDs. In particular embodiments, determination module 1020 may be configured such that when determining the priority of the first message, determination module 1020 determines the priority of the first message based on one or more dynamic priority attributes and one or more static priority attributes. In certain embodiments, determination module 1020 may be configured to, upon the last transmission being received before a first threshold amount of time, determine that the second WD currently holds the floor; and upon the last transmission being received after a first threshold amount of time, determine that the second WD has released the floor.

In certain embodiments, transmission module 1030 may be configured to, upon the floor being available, transmit a first message to the one or more WDs. In particular embodiments, transmission module 1030 may be further configured such that the first message is transmitted without WD 1010 first requesting the floor from a remote floor controller. In some embodiments, transmission module 1030 may be configured to override the current floor holder and transmit the first message to the one or more WDs.

In certain embodiments, reception module 1040 may be configured to receive a second message from a second WD of the one or more WDs. In some embodiments, the first message comprises an identification of the first WD.

In certain embodiments, presentation module 1050 may be configured to present a message received from one of the one or more WDs to a user of WD 1010.

In certain embodiments, update module 1060 may be configured to update a database with the determined priority of the second WD. The database may comprise a determined priority for each of the one or more WDs for which a message has been received.

Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. For example, the embodiment of FIG. 1 depicts WD 110 communicating with network node 120. In other embodiments, WDs 110 and 110a may be out of range of any network node. Similarly, while a number of different combinations of elements and features have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for floor control, the method comprising:
    prior to transmitting a first message to one or more wireless devices, determining, at a first wireless device, a priority of the first message;
    determining, at the first wireless device, whether a floor is available for transmitting the first message based on the determined priority of the first message;
    determining, at the first wireless device, that the floor is held by a second wireless device of the one or more wireless devices;
    determining, at the first wireless device, that the determined priority of the first message is greater than a priority of the current floor holder;
    overriding, at the first wireless device, the current floor holder to make the floor available at the first wireless device; and
    upon the floor being available, transmitting the first message from the first wireless device to the one or more wireless devices without sending a floor request message.

2. The method of claim 1, wherein the first message is transmitted from the first wireless device without the first wireless device first requesting the floor from a remote floor controller.

3. The method of claim 1, further comprising:
    receiving, at the first wireless device, a second message from a second wireless device while the first wireless device is holding the floor, the second wireless device one of the one or more wireless devices;
    determining, at the first wireless device, a priority of the second wireless device based on the second message; and
    upon the priority of the second wireless device being greater than the priority of the first message, releasing the floor.

4. The method of claim 1, further comprising:
    receiving, at the first wireless device, a second message from a second wireless device, the second wireless device one of the one or more wireless devices;
    determining, at the first wireless device, a priority of the second wireless device based on the second message; and
    updating, at the first wireless device, a database with the determined priority of the second wireless device, the database comprising a determined priority for each of the one or more wireless devices for which a message has been received at the first wireless device.

5. The method of claim 1, wherein the first message comprises an identification of the first wireless device.

6. The method of claim 1, wherein determining if the floor is available comprises:
   determining, at the first wireless device, when a last transmission was received from a second wireless device of the one or more wireless devices;
   upon the last transmission being received by the first wireless device before a first threshold, determining that the second wireless device currently holds the floor; and
   upon the last transmission being received by the first wireless device after a first threshold, determining that the second wireless device has released the floor.

7. A wireless device for floor control, the wireless device comprising:
   a processor configured to:
   prior to transmitting a first message to one or more wireless devices, determine a priority of the first message; and
   determine whether a floor is available for transmitting the first message based on the determined priority of the first message;
   determine that the floor is held by a second wireless device of the one or more wireless devices;
   determine that the determined priority of the first message is greater than a priority of the current floor holder; and
   override the current floor holder to make the floor available at the wireless device; and
   a wireless interface coupled to the processor and configured to, upon the floor being determined available, transmit the first message to the one or more wireless devices without sending a floor request message.

8. The wireless device of claim 7, wherein the first message is transmitted without the wireless device first requesting the floor from a remote floor controller.

9. The wireless device of claim 7, wherein:
   the interface is further configured to receive a second message from a second wireless device while the wireless device is holding the floor, the second wireless device one of the one or more wireless devices; and
   the processor is further configured to:
   determine a priority of the second wireless device based on the second message; and
   upon the priority of the second wireless device being greater than the priority of the first message, release the floor.

10. The wireless device of claim 7, wherein:
    the interface is further configured to receive a second message from a second wireless device, the second wireless device one of the one or more wireless devices; and
    the processor is further configured to:
    determine a priority of the second wireless device based on the second message; and
    update a database with the determined priority of the second wireless device, the database comprising a determined priority for each of the one or more wireless devices for which a message has been received by the interface.

11. The wireless device of claim 7, wherein the first message comprises an identification of the wireless device.

12. The wireless device of claim 7, wherein the processor configured to determine if the floor is available is further configured to:
    determine when a last transmission was received from a second wireless device of the one or more wireless devices;
    upon the last transmission being received by the wireless device before a first threshold, determine that the second wireless device currently holds the floor; and
    upon the last transmission being received by the wireless device after a first threshold, determine that the second wireless device has released the floor.

13. A wireless device for floor control, the wireless device comprising a processor and computer readable storage media, the storage media containing instructions executable by the processor, whereby the wireless device is operative to:
    prior to transmitting a first message to one or more wireless devices, determine a priority of the first message;
    determine whether a floor is available for transmitting the first message based on the determined priority of the first message;
    determine that the floor is held by a second wireless device of the one or more wireless devices;
    determine that the determined priority of the first message is greater than a priority of the current floor holder; and
    override the current floor holder to make the floor available at the wireless device; and
    upon the floor being determined available, transmit the first message to the one or more wireless devices without sending a floor request message.

14. The wireless device of claim 13, wherein the first message is transmitted without first requesting the floor from a remote floor controller.

15. The wireless device of claim 13, further operative to:
    receive a second message from a second wireless device while the wireless device is holding the floor, the second wireless device one of the one or more wireless devices;
    determine a priority of the second wireless device based on the second message; and
    upon the priority of the second wireless device being greater than the priority of the first message, release the floor.

16. The wireless device of claim 13, further operative to:
    receive a second message from a second wireless device, the second wireless device one of the one or more wireless devices;
    determine a priority of the second wireless device based on the second message; and
    update a database with the determined priority of the second wireless device, the database comprising a determined priority for each of the one or more wireless devices for which a message has been received by the wireless device.

17. The wireless device of claim 13, wherein the first message comprises an identification of the wireless device.

18. The wireless device of claim 13, wherein the wireless device, operative to determine if the floor is available, is operative to:
    determine when a last transmission was received from a second wireless device of the one or more wireless devices;
    upon the last transmission being received by the wireless device before a first threshold, determine that the second wireless device currently holds the floor; and upon the last transmission being received by the wireless device after a first threshold, determine that the second wireless device has released the floor.

\* \* \* \* \*